(12) United States Patent
Li et al.

(10) Patent No.: US 12,466,207 B2
(45) Date of Patent: Nov. 11, 2025

(54) BRAILLE PRINTING METHOD AND SYSTEM THEREOF

(71) Applicant: XI'AN JIAOTONG UNIVERSITY, Xi'an (CN)

(72) Inventors: Bing Li, Xi'an (CN); Fei Gao, Xi'an (CN); Xiang Wei, Xi'an (CN); Zhongyu Shang, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 773 days.

(21) Appl. No.: 17/748,065

(22) Filed: May 19, 2022

(65) Prior Publication Data

US 2022/0314637 A1    Oct. 6, 2022

Related U.S. Application Data

(63) Continuation of application No. PCT/CN2020/095209, filed on Jun. 9, 2020.

(30) Foreign Application Priority Data

Nov. 19, 2019    (CN) .......................... 201911137652.9

(51) Int. Cl.
  *B41M 3/16*    (2006.01)
  *B41J 3/32*    (2006.01)
  *B41M 3/00*    (2006.01)

(52) U.S. Cl.
  CPC ................ *B41M 3/16* (2013.01); *B41M 3/00* (2013.01); *B41J 3/32* (2013.01)

(58) Field of Classification Search
  CPC ............... B41M 3/16; B41M 3/00; B41J 3/32
  See application file for complete search history.

(56) References Cited

U.S. PATENT DOCUMENTS 6,027,265 A  *  2/2000  Parker .................... B41J 3/407
                                                          412/8
8,050,500 B1 *  11/2011 Batty .................... G06V 30/373
                                                          382/187

(Continued)

FOREIGN PATENT DOCUMENTS

BR    102017015162 A2    1/2019
CN       2246315 Y       1/1997
(Continued)

OTHER PUBLICATIONS

International Search Report (PCT/CN2020/095209); Date of Mailing: Sep. 9, 2020.

(Continued)

*Primary Examiner* — David H Banh
(74) *Attorney, Agent, or Firm* — Wiersch Law Group

(57) ABSTRACT

Disclosed are a braille printing method and a system thereof. The system includes: an instruction control system (300) connected to a computer host and configured to receive a signal including a printing instruction and transmitted by the computer host and send a control instruction; a control panel (200) configured to transmit an operation instruction for implementing printing to the instruction control system; a paper feeding system (400) configured to receive the control instruction and feed paper for printing; a mechanical motion system (500) configured to control a printing system (600) to move in a two-dimensional plane and drive the paper feeding system in response to receiving the control instruction; and the printing system (600) configured to implement printing in response to receiving the control instruction.

10 Claims, 12 Drawing Sheets

(56) References Cited

U.S. PATENT DOCUMENTS

| | | | | |
|---|---|---|---|---|
| 2005/0227207 | A1* | 10/2005 | McAdams | G09B 21/006 |
| | | | | 434/114 |
| 2009/0190147 | A1* | 7/2009 | Uruta | H04N 1/2307 |
| | | | | 358/1.9 |
| 2012/0014603 | A1* | 1/2012 | Batty | G06V 30/373 |
| | | | | 382/187 |
| 2018/0288248 | A1* | 10/2018 | Shen | H04N 1/00403 |
| 2019/0160831 | A1* | 5/2019 | Rai | B41J 3/32 |
| 2019/0347964 | A1* | 11/2019 | Martin | B44C 3/005 |
| 2020/0272819 | A1* | 8/2020 | Beller | G06F 3/014 |

FOREIGN PATENT DOCUMENTS

| | | |
|---|---|---|
| CN | 1262488 A | 8/2000 |
| CN | 101204858 A | 6/2008 |
| CN | 101518997 A | 9/2009 |
| CN | 102855791 A | 1/2013 |
| CN | 104985938 A | 10/2015 |
| CN | 204820692 U | 12/2015 |
| CN | 105404621 A | 3/2016 |
| CN | 105818545 A | 8/2016 |
| CN | 106205294 A | 12/2016 |
| CN | 106864063 A | 6/2017 |
| CN | 109624516 A | 4/2019 |
| CN | 110920268 A | 3/2020 |
| DE | 2601248 A1 | 7/1977 |
| FR | 2717420 A1 | 9/1995 |
| JP | 2001005376 A | 1/2001 |
| KR | 20110085638 A | 7/2011 |

OTHER PUBLICATIONS

CN First Office Action(201911137652.9); Date of Mailing: Aug. 10, 2020.

* cited by examiner

BRAILLE PRINTING METHOD AND SYSTEM THEREOF

TECHNICAL FIELD

The present disclosure relates to the field of braille printing technologies, and in particular, to a braille printing method and a system thereof.

BACKGROUND

Braille is a kind of phonetic alphabet, with "dot" and "cell" as a writing unit and a reading unit, respectively. One braille cell includes six dot positions arranged in two vertical columns, which are arranged according to a particular law of recesses and protrusions. Chinese initials, Chinese finals, tones and punctuations are represented by 1 to 2 cells. Visually impaired people read braille by touching it with their fingers, and the braille is a main written communication way for the visually impaired people.

Braille may be divided into solid braille and hollow braille according to its forming process. The solid braille is made by additive manufacturing on special paper by using reagents such as ink and a foaming agent, while the hollow braille, as a main printing method, is made by mechanical die embossing.

Currently, although a small hollow braille printing device has a relatively small volume, due to limitations of a mechanical structure, braille can be printed only row by row, and continuous printing of a pattern cannot be realized. In addition, it also has the problems of low efficiency, high noise, a high price and so on. In addition, most of the hollow braille is required to use continuous hole paper or kraft paper as a printing material. Such paper has the defects of a high cost and a large gram weight, which also limits the development of the braille printing industry.

SUMMARY

The technical problem to be solved by the present disclosure is to provide a braille printing method and a system thereof that can print ordinary A4 paper and can be configured to print hollow braille and continuous pattern line conveniently, efficiently, with low noise and a low cost, so as to address the shortcomings in the prior art.

The present disclosure adopts the following technical solutions.

A braille printing system, including:
an instruction control system configured to receive a signal including a printing instruction and transmit a control instruction;
a control panel configured to transmit an operation instruction for implementing printing to the instruction control system;
a paper feeding system configured to receive the operation instruction and feed a paper for printing;
a mechanical motion system configured to receive the operation instruction, drive the paper feeding system and control a printing system to move in a two-dimensional plane; and
the printing system configured to implement printing in response to receiving the operation instruction.

Specifically, the control panel is provided with a key configured to realize an on/off function and a pause/start function, a state indicator configured to display a current state of a printer, and a voice prompt module configured to perform voice broadcast.

Specifically, the paper feeding system includes a paper slot, one end of the paper slot is provided with a lifting plate, the paper slot includes an inlet side provided with a paper deflector and an outlet side provided with a paper outlet, and a rubber wheel configured to guide motion of the paper is provided between the paper deflector and the paper slot and between the paper deflector and the paper outlet, respectively.

Specifically, the mechanical motion system includes an X-axis bracket guide rail and a Y-axis bracket guide rail, the X-axis bracket guide rail and the Y-axis bracket guide rail are connected to respective motors to form two linear motion mechanisms, the printing system is connected to and arranged on the Y-axis bracket guide rail, the printing system is driven to move forward and backward in a two-dimensional plane by an X-axis motion, and the printing system is driven to move left and right in the two-dimensional plane by a Y-axis motion.

Specifically, the printing system includes a printing arm, a printing array, a printing head and a printing bottom plate; the printing arm includes an end connected to a Y-axis linear motion mechanism of the mechanical motion system and another end connected to the printing array, and the printing array includes an area array and at least one single-dot array; the printing area array includes a plurality of printing heads arranged in rows and columns, and each of the at least one single-dot array is connected to a respective printing head of the plurality of printing heads; and the printing bottom plate is placed on a printing bottom surface and configured to carry the paper for printing.

Another technical solution of the present disclosure is a braille printing method using the braille printing system describe above, and the braille printing method includes:
S1: establishing a database including a library of common Chinese character pronunciations, a library of polyphones and special words, a library of Chinese initials and Chinese finals, a library of numbers, a library of punctuations and a library of English letters; extracting and isolating a text by using special symbols according to a corresponding setting scheme; converting the text into Pinyin according to the database; converting Pinyin, English, numbers and punctuations into braille respectively; and converting the braille into a control instruction;
S2: receiving the control instruction in step S1, and arranging a printing array of braille characters by dense arrangement or printing in alternate columns and rows according to a longitudinal projection size of at least one printing head;
S3: performing braille printing for continuous braille cell printing and printing in alternate columns and rows respectively; and
S4: printing a pattern.

Specifically, in S1, said extracting and isolating Pinyin, English, numbers and punctuations by using special symbols includes:
S1011: extracting structures of pronunciation units each formed by a character or a term, and storing each of the extracted structures separately with [ ];
S1012: extracting structures of units each formed by successive Arabic numerals, and storing each of the extracted structures separately with [ ];
S1013: extracting structures of units each formed by English or a punctuation, wherein each letter of English is taken as an extraction unit; and storing each of the extracted structures separately with [ ]; and S1014: converting Chinese characters into Pinyin according to the library of common Chinese character pronunciations and the library of polyphones and special words, and storing each of the extracted structures separately with [ ].

Specifically, in S1, said converting Pinyin, English, numbers and punctuations into braille includes:

S1021: starting from a top left point of a braille cell, sequentially numbering six dot positions of the braille cell as 1, 2, 3, 4, 5 and 6 in an order "from top to bottom and then from left to right"; and defining the braille cell as a two-dimensional matrix with three rows and two columns of [[0,1,0],[1,0,1]], where "1" and "0" indicate whether a dot exists at a respective dot position of the six dot positions;

S1022: setting a number of cells displayed per row to realize typesetting; and

S1023: mirroring each braille and each row of braille regarding left and right, since the braille is written from right to left during printing.

Specifically, in S3, when printing in alternate rows and columns is adopted, a printing range formed by a printing range projected by the printing region, m columns adjacent to the printing region and n rows below the printing region is determined; a number of cells per row is defined as L, a size of the printing array is defined as M rows and N columns, and a number of rows printed on each paper is defined as K, then following relations are determined:

$$\begin{cases} L \times K \le n \cdot N \times m \cdot M, \text{ where } L \le n \cdot N, \text{ and } K \le m \cdot M & (1) \\ L \times K > n \cdot N \times m \cdot M, \text{ where } L > n \cdot N, \text{ and } K > m \cdot M & (2) \end{cases}$$

when the relation (1) is satisfied, it indicates that a braille region on a paper is less than or equal to a coverage of the array in one printing; after completion of printing a current cell of the braille, each of the at least one printing head of the mechanical motion system sequentially prints cells of the braille in adjacent a columns and b rows according to a set step strategy; and a printing signal is not received when a corresponding printing head does not perform braille printing on any content; and when the relation (2) is satisfied, it indicates that the braille region on a paper is beyond a coverage of the array in one printing; and after completion of printing a current printing range, the mechanical motion system moves to a subsequent printing range based on a spatial location of the printing array to print the braille within the subsequent printing range.

Specifically, in S4, said printing a pattern includes: firstly, converting a pattern to a printing path, and performing digital image processing on a drawn picture by binarization and edge extraction, to obtain a line contour of the pattern; then, planning, according to the contour and a related drawing path algorithm, a path for the at least one printing head to print the pattern; setting, in an instruction control system, a length of each pixel in the line contour to be equal to a feeding step of a stepping motor; and completing continuous drawing of each line in turn, and returning to a standby position upon completion of printing the pattern on a whole paper.

Compared with the prior art, the present disclosure has at least the following beneficial effects.

The braille printing system according to the present disclosure realizes accurate printing positioning by controlling the mechanical motion system. On the one hand, a printing system carrying a plurality of printing heads can simultaneously print a plurality of braille characters on a paper according to a transmission signal, thereby improving the printing efficiency. On the other hand, a single-dot array may be used, and the mechanical motion system can be controlled to perform two-dimensional continuous motion along an XY direction, so as to meet a requirement for printing a pattern, and the paper feeding system can ensure loading and unloading functions of ordinary A4 paper.

Further, the control panel can realize the control over the braille printing system. The key is provided with text and braille and is provided with a voice prompt module, which is convenient for the blind to operate.

Further, the paper feeding system can hold and transfer the paper for printing to printing positions in turn, and deliver the paper out after the whole paper is printed, so as to realize a function of automatic paper feeding.

Further, the mechanical motion system can realize accurate displacement and positioning in the two-dimensional plane, so as to carry the printing system to reach the corresponding printing position.

Further, the printing system is a key structure to realize braille printing, which can adjust array layout of the printing array according to the requirements of the braille printing, or realize pattern printing by using a single-dot array. When the printing array is adopted, braille can be printed in different paper regions at the same time, which improves the printing efficiency. When the single-dot array is adopted, a pattern of continuous lines can be printed.

With braille printing method according to the present disclosure, a mixed document including Chinese characters, numbers, English and punctuations can be converted into braille.

Further, Chinese characters in braille are written in a form of Pinyin according to a related method of braille spelling. Therefore, the Chinese characters are required to be converted into Pinyin at first. This method can mark a tone according to the pronunciation of a polyphone in a specific phrase, which improves the accuracy of braille spelling.

Further, the conversion of Pinyin, numbers, letters and special symbols after extraction and isolation into braille can not only improve the reading accuracy of these different types of braille, but also improve the conversion efficiency.

Further, the braille printing method in alternate columns and rows has low requirements on hardware arrangement of the printing system and can realize efficient printing planning.

Based on the above, the system designed in the present disclosure has a compact structure and a small size, and all the mechanisms have low operating noise and a high response speed and are provided with a braille control panel and a voice prompt function; the function of a small braille printing machine is ensured, the printing efficiency is improved, the paper requirements are reduced, the hardware cost is controlled, and the needs of the blind to print braille can be met.

The technical solutions of the present disclosure are described in further detail below with reference to accompanying drawings and embodiments.

DESCRIPTION OF EMBODIMENTS

In the description of the present disclosure, it should be understood that the orientation or position relationship indicated by the terms such as "center", "longitudinal", "transverse", "upper", "lower", "front", "rear", "left", "right", "vertical", "horizontal", "top", "bottom", "inner", "outer", "one side", "one end", and "one edge" are based on the orientation or position relationship shown in the accompanying drawings, and are intended to facilitate description of the present disclosure and simplify the description only, rather than indicating or implying that the device or element referred thereto must have a particular orientation or be constructed and operated in a particular orientation, and therefore are not to be interpreted as limiting the present disclosure. In addition, the terms "first", "second" and this like are used for descriptive purposes only, which cannot be construed as indicating or implying a relative importance, or implicitly specifying the number of the indicated technical features. Thus, the features defined with "first" and "second" may explicitly or implicitly include one or more features. In the description of the present disclosure, "a plurality of" means two or more than two, unless specifically stated otherwise.

In the description of the present disclosure, unless specifically stated and limited otherwise, the terms "installing", "connecting", and "coupling" should be understood in a broad sense, such as, a fixed connection, a detachable connection, or an integral connection; a mechanical connection or an electrical connection; a direct connection, an indirect connection through an intermediate medium, or an internal connection of two elements. For those of ordinary skill in the art, the specific meanings of the foregoing terms in the present disclosure can be understood on a case-by-case basis.

Figure 1:
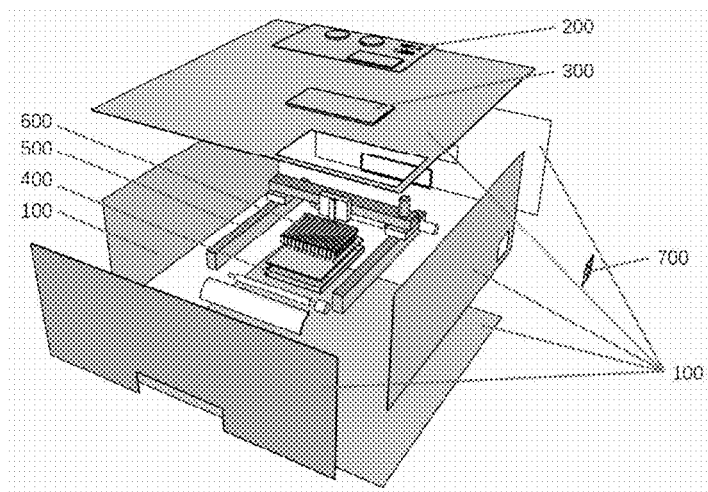
FIG. 1 is a structural diagram of a braille printing system according to the present disclosure.
Figure 2:
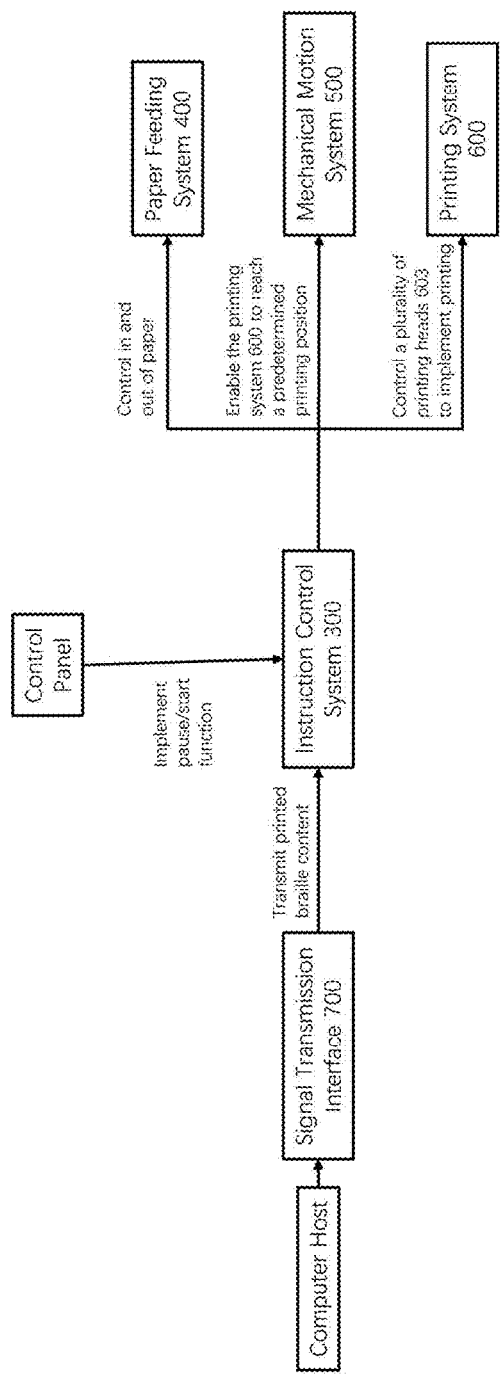
FIG. 2 is a schematic diagram of the braille printing system according to the present disclosure.

Referring to FIG. 1 and FIG. 2, the present disclosure provides a braille printing system, including a case 100, a control panel 200, an instruction control system 300, a paper feeding system 400, a mechanical motion system 500, a printing system 600 and a signal communication interface 700.

The instruction control system 300 is connected to the control panel 200, the paper feeding system 400, the mechanical motion system 500, the printing system 600 and the signal communication interface 700. A computer host transmits a signal including a printing instruction to the instruction control system 300 through the signal communication interface 700. The control panel 200 sends an operation instruction for implementing printing to the instruction control system 300. The instruction control system 300 controls, according to the printing instruction from the computer host, the paper feeding system 400 to feed a paper for printing, the mechanical motion system 500 to move the printing system 600 to a printing position, the printing system 600 to implement printing, the mechanical motion system 500 to move the printing system 600 to an initial position after completion of printing the content on the whole paper, the paper feeding system 400 to deliver the paper out, and a new paper to be fed if there is still a printing task. During the printing of the braille printing system, an emergency stop of the system can be realized through a pause/start function key 202 of the control panel 200. After the pause/start function key 202 is clicked again, the system may continue to print the content that has not been printed in the emergency stop.

Figure 3:
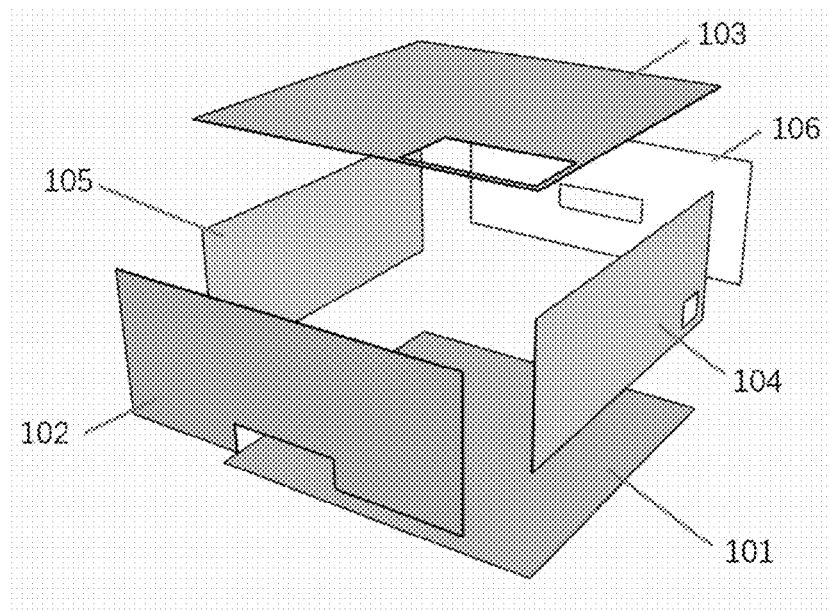
FIG. 3 is a structural diagram of a case of the braille printing system according to the present disclosure.

Referring to FIG. 3, the case 100 includes a bottom plate 101, a panel 102, a top plate 103, a left plate 104, a right plate 105 and a rear plate 106. The bottom plate 101, the panel 102, the top plate 103, the left plate 104, the right plate 105 and the rear plate 106 are connected to one another to form a closed structure. The instruction control system 300 is arranged inside the case 100, and the control panel 200 is mounted onto the case 100. The paper feeding system 400, the control panel 200 and the instruction control system 300 can be arranged in different regions as needed.

Figure 4:
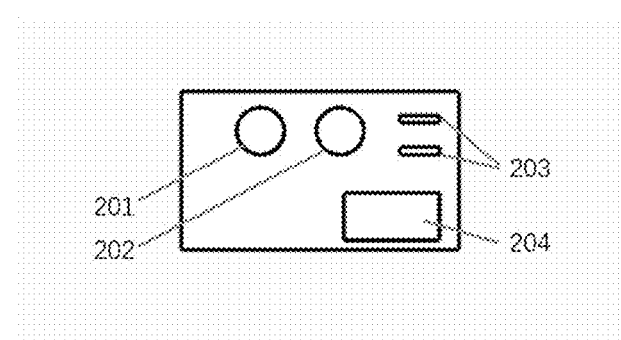
FIG. 4 is a structural diagram of a control panel of the braille printing system according to the present disclosure.

Referring to FIG. 4, the control panel 200 includes an on/off function key 201, a pause/start function key 202, a state indicator 203 and a voice prompt module 204. The on/off function key 201 is configured to control on/off of a power supply of the control system. The pause/start function key 202 is configured to realize emergency stop and recovery functions in an operation state. The state indicator 203 is configured to display a current state of a printer. The voice prompt module 204 may broadcast the above operations by voice. The above function keys are printed in braille to facilitate operation from the blind.

Figure 5:
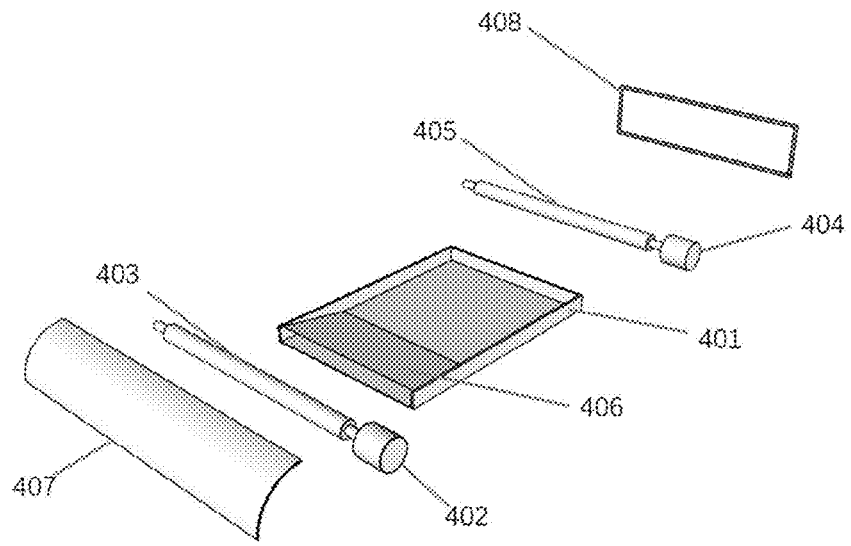
FIG. 5 is a structural diagram of a paper feeding system of the braille printing system according to the present disclosure.

Referring to FIG. 5, the paper feeding system 400 includes a paper slot 401, a stepping motor A402, a rubber wheel A403, a stepping motor B404, a rubber wheel B405, a lifting plate 406, a paper deflector 407 and a paper outlet 408. The paper slot 401 is configured to hold the paper for printing. The stepping motor A402 and the stepping motor B404 are configured to drive the rubber wheel A403 and the rubber wheel B405 to guide the paper to move forward or backward respectively. The paper deflector 407 is configured to guide the paper to reach a printing position. The rubber wheel A403 and the rubber wheel B405 are configured to abut against the paper to realize paper motion. The lifting plate 406 is configured to lift one edge of an ordinary paper during paper feeding, so that the rubber wheel A403 can contact the paper. The paper outlet 408 is configured to output the printed paper.

Figure 6:
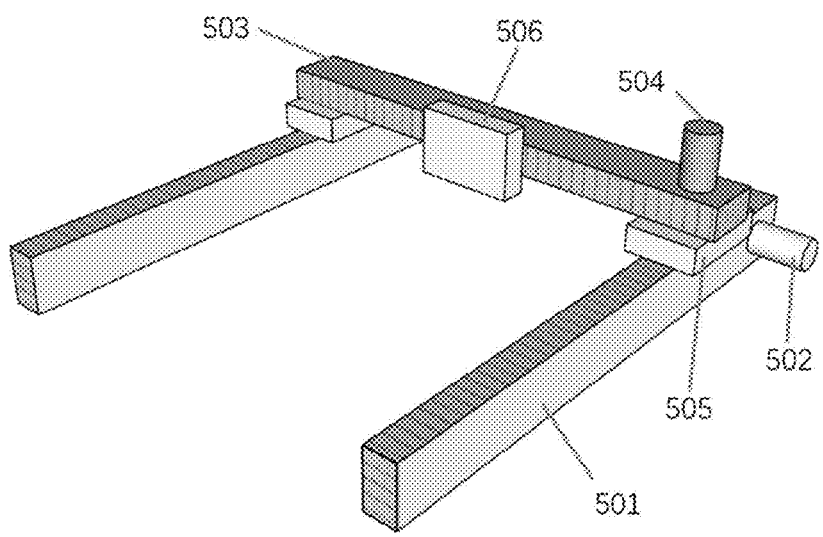
FIG. 6 is a structural diagram of a mechanical motion system of the braille printing system according to the present disclosure.

Referring to FIG. 6, the mechanical motion system 500 includes an X-axis bracket guide rail 501, an X-axis stepping motor 502, a Y-axis bracket guide rail 503, a Y-axis stepping motor 504, an X-axis synchronous belt 505 and a Y-axis synchronous belt 506. The X-axis bracket guide rail 501 and the Y-axis bracket guide rail 503 are provided with the X-axis synchronous belt 505 and the Y-axis synchronous belt 506 respectively and are connected to the X-axis stepping motor 502 and the Y-axis stepping motor 504 respectively, so as to form two linear motion mechanisms. An X-axis motion mechanism is configured to realize forward and backward motion in the two-dimensional plane, and a Y-axis linear motion mechanism is configured to realize left and right motion in the two-dimensional plane. The Y-axis linear motion mechanism is carried on the X-axis motion mechanism. The motion mechanism consisting of the guide rail, the stepping motor and the synchronous belt can realize high-precision printing positioning. As a carrying system of two-dimensional motion of the printing system, the synchronous belt and the bracket guide rail can be replaced by a lead screw guide rail or a similar electrically controlled displacement mechanism.

Figure 7:
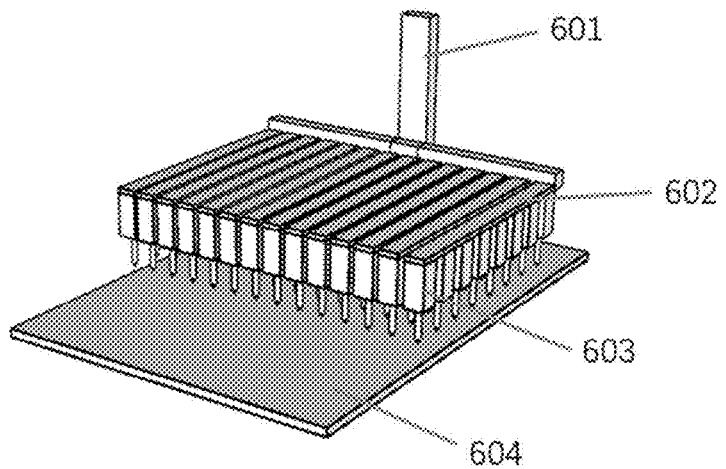
FIG. 7 is a structural diagram of a braille printing system according to the present disclosure.
Figure 8:
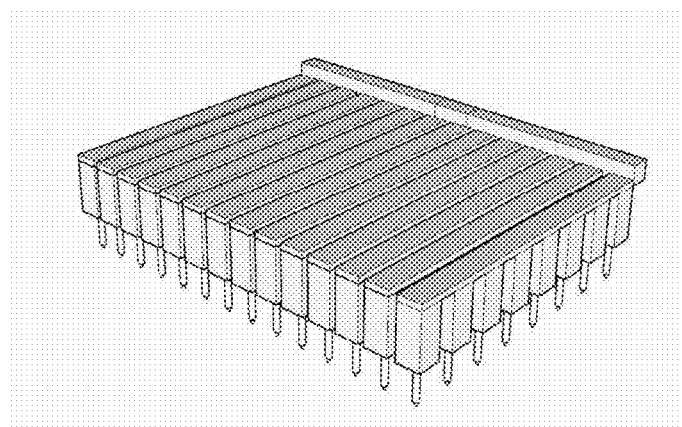
FIG. 8 is a structural diagram of a printing array of the braille printing system according to the present disclosure.
Figure 9:
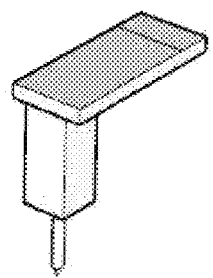
FIG. 9 is a schematic diagram of a single printing head of the braille printing system according to the present disclosure.

Referring to FIG. 7, the printing system 600 includes a printing arm 601, a printing array 602, a printing head 603 and a printing bottom plate 604. The printing arm 601 is fixed to the Y-axis motion mechanism on the one hand and fixed to the printing array 602 on the other hand. According to the requirements of braille printing and pattern printing, the printing array includes an area array 6021 and a single-dot array 6022, as shown in FIG. 8 and FIG. 9 respectively. The area array 6021 includes a plurality of printing heads 603 arranged in rows and columns according to a specific printing requirement. The single-dot array 6022 is fixed with only one printing head 603. The printing head 603 is an electrically controlled mechanical telescopic mechanism such as an electric solenoid, an electromagnet or a piezoelectric sensor. The printing bottom plate 604 is configured to carry the paper for printing which is placed on a printing bottom surface, which may be made of a soft plate of a composite material such as hard rubber or a hard plate with a concave hole array.

Figure 10:
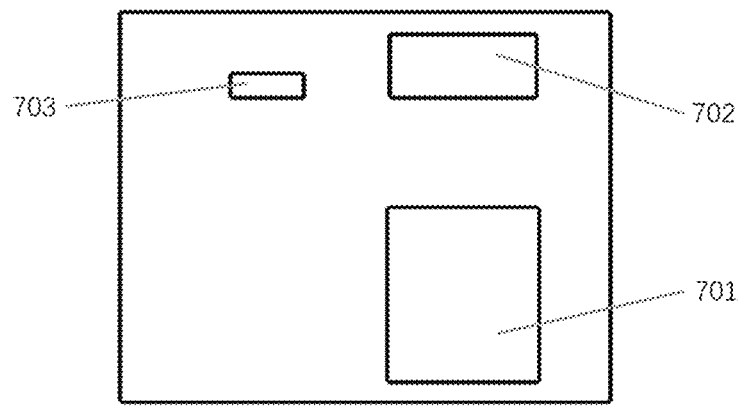
FIG. 10 is a schematic diagram of a signal communication interface of the braille printing system according to the present disclosure.

Referring to FIG. 10, the signal communication interface 700 includes a power supply interface 701, a wired communication interface 702 (including, but not limited to, a USB interface, an RS-232 interface and an RJ45 interface) and a wireless communication interface 703 (including, but not limited to, NFC, Bluetooth, Wi-Fi and other interfaces conforming to an IEEE 802.11 standard specification). The power supply interface 701 is configured to connect the printer to a 220-V power supply for power supply. The wired communication interface 702 and the wireless communication interface 703 perform data communication with the computer host through a wired connection and a wireless connection respectively.

The present disclosure provides a braille printing method using the braille printing system described above, including the following steps.

S1: Method for Conversion from Text to Braille

According to a mechanical structure proposed at present, there is a need to convert text inputted in the computer host into braille and finally realize a function of controlling the printer to realize braille printing. Firstly, a related database including a library of common Chinese character pronunciations, a library of polyphones and special words, a library of Chinese initials and Chinese finals, a library of numbers, a library of punctuations and a library of English letters is required to be established.

The library of common Chinese character pronunciations and the library of polyphones and special words are configured to perform conversion of Chinese characters and Pinyin, while the rest libraries are configured to perform conversion of braille. The library of Chinese character pronunciations refers to a mapping database including Chinese characters with individual pronunciations and corresponding Pinyin writings.

The library of polyphones and special words refers to a mapping database including polyphones or words with special pronunciations in special phrases and corresponding Pinyin writings established in accordance with the National Universal Braille Scheme (hereinafter referred to as the "Scheme") issued in 2018. In addition, this library further includes a mapping database including 8 types of common tone-saving writings and 6 types of regular characters written together and corresponding Pinyin writings listed in the scheme.

The library of Chinese initials and Chinese finals refers to a mapping database including 23 Chinese initials, 24 Chinese finals, 4 types of tones and corresponding braille representations listed in the scheme.

The library of numbers refers to a mapping database including Arabic numerals (0 to 9 and numeric identifiers) and corresponding braille representations listed in the scheme.

The library of punctuations refers to a mapping database including 24 symbols including common written symbols such as a period, a comma and a stop, newline ligatures, Latin upper-case letters and lower-case letters, and Greek upper-case letters and lower-case letters, and corresponding braille representations listed in the scheme.

The library of English letters refers to a mapping database including 26 English letters and corresponding braille representations listed in the scheme.

A specific implementation process involves the following steps.

In S101, a text is converted into Pinyin.

A text is converted into Pinyin, and special symbols such as letters, numbers and punctuations are converted according to provisions in the scheme. Word units in a document are extracted and isolated with a symbol such as "[ ]". Specific conversion steps are as follows.

In S1011, structures with characters and words as pronunciation units are extracted, and each extracted structure is stored separately with [ ].

In S1012, successive Arabic numerals are taken as a whole, and each extracted structure is stored separately with [ ].

In S1013, structures of English and punctuations in an example sentence are extracted, wherein English takes a letter as an extraction unit, and each extracted structure is stored separately with [ ].

In S1014, Chinese characters are converted into Pinyin according to the library of common Chinese character pronunciations and the library of polyphones and special words, and each extracted structure is stored separately with [ ].

In S102, Pinyin is converted into braille.

The conversion from pinyin to braille is realized according to the library of Chinese initials and Chinese finals, the library of numbers, the library of punctuations and the library of English letters, and specific conversion steps are as follows.

In S1021, starting from a top left point of a braille "cell", six dot positions of the braille "cell" may be sequentially numbered as 1, 2, 3, 4, 5 and 6 in an order "from top to bottom and then from left to right". In a programming language, a "cell" may be defined as a two-dimensional matrix with three rows and two columns of [[0,1,0],[1,0,1]], wherein "1" and "0" indicate whether a dot exists at a respective dot position of the six dot positions.

In S1022, since written braille takes up more paper space than Chinese characters, a set number of "cells" per row is required for typesetting.

In S1023, since the braille printing adopts a method of downward embossing, downward concave dots are present in printing positions. During reading, the whole paper is required to be turned over and convex dots are touched for reading. Therefore, braille is arranged from right to left during printing, so that each braille and each row of braille are required to be mirrored regarding left and right.

In S103, braille is converted into a control instruction.

When the printing array reaches a specified printing position and starts printing, the instruction control system extracts printed braille information corresponding to each printing head according to a printing region for each printing head. Then, a first element in a first three-row, two-column two-dimensional matrix in the braille information is traversed. If it is "1", a signal is sent to the printing head to complete mechanical motion of one stroke, so as to realize the printing at the position. If it is "0", it indicates that no printing is needed at the position, and thus no signal is sent to the printing head. After six elements of a two-dimensional matrix have been traversed, a braille cell is printed. Then, six elements in a second two-dimensional matrix in the braille information are then traversed to complete the printing of a second braille cell. This method is performed until the braille information corresponding to each printing head is read completely, and the corresponding signal is sent to the printing head, so as to realize the process of converting braille into a control instruction.

So far, a document has been converted to a signal of printing braille.

S2: Arrangement of a Printing Array of Braille Characters

The printing array is a two-dimensional array with M rows and N columns, and carries M×N printing heads in total. M and N are determined according to a number of cells simultaneously printed in braille at one time on A4 paper. The printing head is a key element of the printer for realizing braille printing, which can realize periodic reciprocating stroke motion after receiving a pulse signal. According to a principle of implementation, main printing heads at present are implemented as an electric solenoid type, a piezoelectric ceramic type and a pneumatic type. When a longitudinal projection size of the printing head is less than a size of the braille cell, dense arrangement is adopted and continuous braille cell printing may be performed. When the longitudinal projection size of the printing head is greater than the size of the braille cell, printing in alternate columns and rows is adopted, and numbers of rows and columns of the array can be changed according to the cost and printing efficiency of the printer.

S3: Method for Implementing Braille Printing

For continuous braille cell printing, each row and each column can be printed with a same feeding step by a mechanical motion system. For printing in alternate columns and rows, a corresponding printing method is required to be designed to ensure the printing efficiency. The mechanical motion system carrying the printing array is at a starting position at the beginning of the printing. In this case, a printing region projected by the printing array, m columns adjacent to the printing region and n rows below the printing region are collectively referred to as a "printing range" (m and n depend on a specific printing strategy). Within this range, the mechanical motion system is not required to perform long-distance motion. After completion of printing of a current braille cell, each printing head completes printing of braille cells in adjacent a columns and b rows in turn according to a stepping strategy.

Since the number L of "cells" per row has been defined during braille conversion and a size of the printing array (M rows and N columns of printing heads) and a number K of rows printed on a paper are known, the following relations are determined:

$$\begin{cases} L \times K \le n \cdot N \times m \cdot M, \text{ where } L \le n \cdot N, \text{ and } K \le m \cdot M & (1) \\ L \times K > n \cdot N \times m \cdot M, \text{ where } L > n \cdot N, \text{ and } K > m \cdot M & (2) \end{cases}$$

When "≤" shown in (1) is satisfied, it indicates that a braille region on a paper is less than or equal to a coverage of the array in one printing. In this case, the mechanical motion system is not required to perform long-distance motion. After completion of printing a current cell of the braille, each printing head sequentially prints cells of the braille in adjacent a columns and b rows according to the stepping strategy. During the braille conversion, the braille corresponds to the printing head, so a printing signal is not received when the corresponding printing head does not perform braille printing on any content currently.

When ">" shown in (2) is satisfied, it indicates that the braille region on a paper is beyond the coverage of the array in one printing. In this case, after completion of printing a current printing range, the mechanical motion system moves to a subsequent printing range based on a spatial location of the printing array to print the braille within the subsequent printing range.

Finally, after completion of braille printing on an A4 paper, the printing array moves from the mechanical motion system to the starting position.

The working principle of the present disclosure is as follows.

Firstly, the power supply is switched on, the printer is in a standby state through the control panel 200. After the computer host sends a printing instruction, the wired communication interface 702 or the wireless communication interface 703 of the signal communication interface 700 receives the instruction, and the instruction is sent to the instruction control system 300. After receiving the printing instruction, the instruction control system 300 controls the paper feeding system 400, the lifting plate 406 lifts one edge of the paper, and the stepping motor A402 drives the rubber wheel A403 to guide the paper onto the printing bottom plate 604. Then, the instruction control system 300 drives the mechanical motion system 500 to adjust a printing position. In this process, the printing array 602 clamping the printing head 603 is fixed by the printing arm 601 and performs adjustment together with the mechanical motion system. Afterwards, the instruction control system 300 sends a printing signal to each printing head 603 according to braille text content, so that a plurality of printing heads 603 can simultaneously complete a printing cycle in different regions of the paper. Finally, the instruction control system 300 sends a motion instruction to the mechanical motion system 500, and the mechanical motion system 500 moves the printing head 603 to a next printing position. The printing process is cycled until completion of the braille content on this paper. Then, the stepping motor B404 of the paper feeding system 400 drives the rubber wheel B405 to output the paper from the paper outlet 408.

In addition, for pattern printing, only a printing area array 6021 on the printing arm 601 is required to be removed, and the printing single-dot array 6022 is installed. In this case, the printing bottom plate 604 should be a soft plate made of a material such as rubber. The instruction control system 300, in response to receiving the corresponding printing instruction, controls the mechanical motion system 500 to move the single-dot array 6022 to an initial printing position and perform motion according to a path of the pattern. During the motion, the printing head 603 on the single-dot array 6022 is in an excited printing state, so as to realize the pattern printing.

In order to better illustrate the objectives, technical solutions and advantages of the embodiments of the present disclosure, the technical solutions in the embodiments of the present disclosure will be further described below with reference to the accompanying drawings in the embodiments of the present disclosure. It should be noted that the embodiments described herein are only some rather than all of the embodiments of the present disclosure. In general, the components of the present disclosure described and shown in the drawings herein may be arranged and designed in a variety of configurations. Therefore, the following detailed description of the embodiments of the present disclosure provided in the drawings is not intended to limit the scope of the present disclosure for which protection is sought, but to represent only optional embodiments of the present disclosure. All other embodiments obtained by those of ordinary skill in the art without making creative efforts based on the embodiments in the present disclosure shall fall into a scope of the present disclosure.

1: Method for Conversion from Text to Braille

For the braille printing, firstly, a software structure in the instruction control system 300 is used to convert text to a braille printing instruction on the computer host. A specific conversion process is described below by taking a Chinese sentence "我正在阅读《基于Python语言的20个实践项目案例》" as an example.

1) The library of polyphones and special words are traversed to determine pronunciations of Chinese characters with special requirements such as polyphones. According to the ligature requirements of the scheme, "General rules for word-segmentation ligature: a basic unit of writing is word, and each syllable of a word is written together". In the example sentence, each of the words "我", "正在", "阅读", "基于", "语言", "个", "实践", "项目" and "案例" is a ligature structure, then the example sentence can be divided into [[我][正在][阅读]《[基于]Python[语言]的20[个][实践][项目][案例]》].

2) Since the scheme stipulates that a special symbol shall be marked before the Arabic numerals, "20" is extracted as a whole, so the example sentence can be divided into [[我][正在][阅读]《[基于]Python[语言]的[20][个][实践][项目][案例]》].

3) Structures such as English and punctuations in the example sentence are extracted, wherein English takes a letter as an extraction unit, so the example sentence can be divided into [[我][正在][阅读][《][基于][P][y][t][h][o][n][语言][的][20][个][实践][项目][案例][》]].

Figure 11:
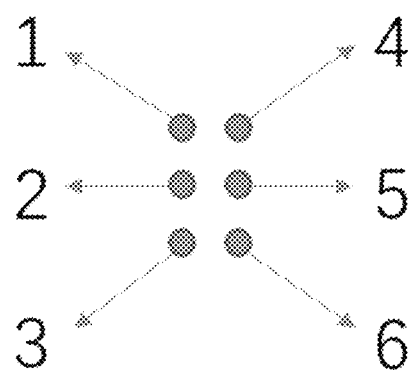
FIG. 11 is a schematic diagram of a braille cell of a printing method according to the present disclosure.

4) The Chinese characters are converted to Pinyin according to the library of common Chinese character pronunciations and the library of polyphones and special words, and the example sentence can be divided into
[[wo][zheng4zai4][yue4du2][《][ji1yu2][P][y][t][h][o][n][yu3yan2][de][20][ge][s hi2jian4] [xiang4mu] [an4li] [》]];

5) Starting from a top left point of a braille cell, six dot positions of the braille cell may be sequentially numbered as 1, 2, 3, 4, 5 and 6 in an order "from top to bottom and then from left to right", as shown in FIG. 11. In a programming language, a "cell" may be defined as a two-dimensional matrix with three rows and two columns of [[0,1,0],[1,0,1]], wherein "1" and "0" indicate whether a dot exists at a respective dot position of the six dot positions. According to the library of Chinese initials and Chinese finals, the library of numbers, the library of punctuations and the library of English letters, the example sentence may be converted to:
[[[1,0,1],[0,1,0]],[[0,0,1],[1,0,0]],[[0,0,1],[1,1,1]],[[0,1,1],[0,0,0]],[[1,0,1],[0,1,1]],[[0,1,0],[1,0, 1]],[[0,1,1],[0,0,0]],[[0,1,1][1,1,1]],[[0,1,1],[0,0,0]],[[1,0,0],[1,1,0]],[[1,0,1],[0, 0,1]],[[0,1,0],[0, 0,0]],[[0,0,0],[0,1,0]],[[0,0,1],[0,0,1]],[[1, 1,0],[1,1,0]],[[0,1,0],[1,0,0]],[[1,0,0],[0,0,0]],[[0,0,1],[1,0, 1]],[[0,1,0],[0,0,0]],[[0,0,0],[0,0,1]],[[1,1,1],[1,0,0]],[[1,0, 1],[1,1,1]],[[0,0,0],[0,1,1]],[[1, 0,1],[1,1,1]],[[0,0,0],[0,1, 1]],[[1,0,1],[1,1,1]],[[0,1,1],[1,1,0]],[[1,1,0],[0,1,0]],[[1,0, 1],[0,1,0]], [[1,0,1],[1,1,0]],[[0,0,1],[1,0,1]],[[1,0,0],[1,0, 1]],[[0,1,0],[0,0,0]],[[1,0,0],[1,1,0]],[[0,1,0],[0,0, 1]],[[0,0, 1],[1,1,1]],[[1,1,0],[0,0,0]],[[0,1,0],[1,1,0]],[[1,1,0],[1,1,0]], [[0,1,0],[0,0,1]],[[1,0,0],[0,1,1]],[[0,1,0],[1,0,0]],[[0,1,0],[1, 0,0]],[[1,1,0],[0,1,0]],[[1,0,0],[1,0,1]],[[0,1,1],[0,0,0]],[[1,1, 0],[0,1,0]],[[1,0,1],[1,0,1]],[[1,0,1],[1,0,0]],[[1,0,1],[0,0,1]], [[0,1,1],[0,0,0]],[[1,1,1],[0,0,1]],[[1,1,1],[0,0,0]],[[0,1,0],[1, 0,0]],[[0,1,1],[0,0,0]]];

6) Since written braille takes up more paper space than Chinese characters, a set number of "cells" per row is required for typesetting. For example, 12 cells are displayed in each row, then 12 two-dimensional matrices are extracted in turn and placed in "[ ]", and the example sentence may be expressed as:

[[[1,0,1],[0,1,0]],[[0,0,1],[1,0,0]],[[0,0,1],[1,1,1]],[[0,1, 1],[0,0,0]],[[1,0,1],[0,1,1]],[[0,1,0],[1, 0,1]],[[0,1,1],[0, 0,0]],[[0,1,1],[1,1,1]],[[0,1,1],[0,0,0]],[[1,0,0],[1,1,0]], [[1,0,1],[0,0,1]],[[0,1,0],[0,0,0]]],

[[[0,0,0],[0,1,0]],[[0,0,1],[0,0,1]],[[1,1,0],[1,1,0]],[[0,1, 0],[1,0,0]],[[1,0,0],[0,0,0]],[[0,0,1],[1,0, 1]],[[0,1,0],[0, 0,0]],[[0,0,0],[0,0,1]],[[1,1,1],[1,0,0]],[[1,0,1],[1,1,1]], [[0,0,0],[0,1,1]],[[1,0,1],[1,1,1]]],

[[[0,0,0],[0,1,1]],[[1,0,1],[1,1,1]],[[0,1,1],[1,1,0]],[[1,1, 0],[0,1,0]],[[1,0,1],[0,1,0]],[[1,0,1],[1,1, 0]],[[0,0,1],[1, 0,1]],[[1,0,0],[1,0,1]],[[0,1,0],[0,0,0]],[[1,0,0],[1,1,0]], [[0,1,0],[0,0,1]],[[0,0,1],[1,1,1]]],

[[[1,1,0],[0,0,0]],[[0,1,0],[1,1,0]],[[1,1,0],[1,1,0]],[[0,1, 0],[0,0,1]],[[1,0,0],[0,1,1]],[[0,1,0],[1,0, 0]],[[0,1,0],[1, 0,0]],[[1,1,0],[0,1,0]],[[1,0,0],[1,0,1]],[[0,1,1],[0,0,0]], [[1,1,0],[0,1,0]],[[1,0,1],[1,0,1]]],

[[[1,0,1],[1,0,0]],[[1,0,1],[0,0,1]],[[0,1,1],[0,0,0]],[[1,1, 1],[0,0,1]],[[1,1,1],[0,0,0]],[[0,1,0],[1,0, 0]],[[0,1,1],[0, 0,0]]]];

7) Each braille and each row of braille are required to be mirrored regarding left and right, and the example sentence may be expressed as:

[[[0,0,0],[0,1,0]],[[0,0,1],[1,0,1]],[[1,1,0],[1,0,0]],[[0,0,0],[0,1,1]],[[1,1,1],[0,1,1]],[[0,0,0],[0,1,1]],[[1,0,1],[0,1,0]],[[0,1,1],[1,0,1]],[[0,0,0],[0,1,1]],[[1,1,1],[0,0,1]],[[1,0,0],[0,0,1]],[[0,1,0],[1,0,1]]],

[[[1,1,1],[1,0,1]],[[0,1,1],[0,0,0]],[[1,1,1],[1,0,1]],[[1,0,0],[1,1,1]],[[0,1,1][0,0,0]],[[0,0,0][0,1,0]],[[1,0,1],[0,0,1]],[[0,0,0],[1,0,0]],[[1,0,0],[0,1,0]],[[1,1,0],[1,1,0]],[[0,0,1],[0,0,1]],[[0,1,0],[0,0,0]]],

[[[1,1,1],[0,0,1]],[[0,0,1],[0,1,0]],[[1,1,0],[1,0,0]],[[0,0,0],[0,1,0]],[[1,0,1],[1,0,0]],[[1,0,1],[0,0,1]],[[1,1,0],[1,0,1]],[[0,1,0],[1,0,1]],[[0,1,0],[1,1,0]],[[1,1,0],[0,1,1]],[[1,1,1][1,0,1]],[[0,1,1][0,0,0]]],

[[[1,0,1],[1,0,1]],[[0,1,0],[1,1,0]],[[0,0,0],[0,1,1]],[[1,0,1],[1,0,0]],[[0,1,0],[1,1,0]],[[1,0,0],[0,1,0]],[[1,0,0],[0,1,0]],[[0,1,1],[1,0,0]],[[0,0,1],[0,1,0]],[[1,1,0],[1,1,0]],[[1,1,0],[0,1,0]],[[0,0,0],[1,1,0]]],

[[[0,0,0],[0,1,1]],[[1,0,0],[0,1,0]],[[0,0,0],[1,1,1]],[[0,0,1],[1,1,1]],[[0,0,0],[0,1,1]],[[0,0,1],[1,0,1]],[[1,0,0],[1,0,1]]].

2: Arrangement of a Printing Array of Braille Characters

Figure 12:
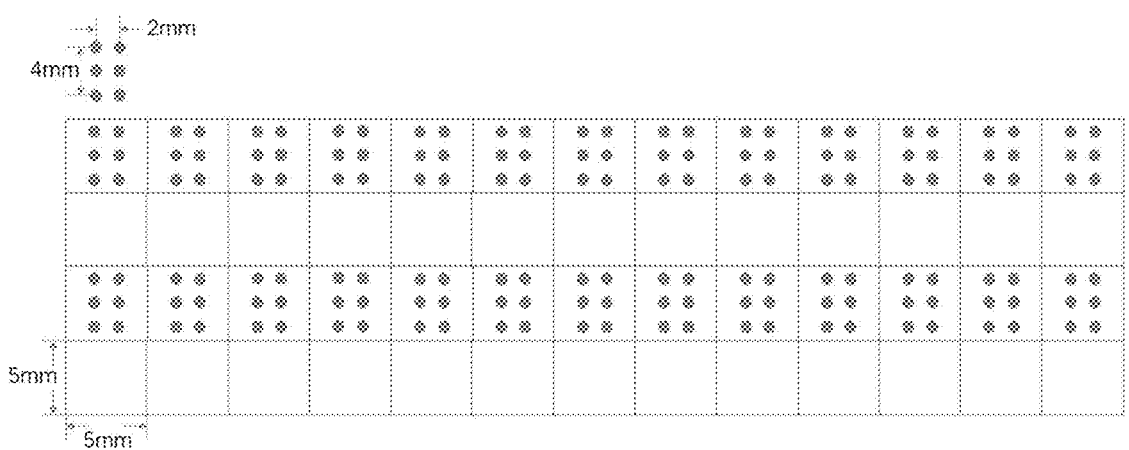
FIG. 12 is a layout diagram of a printing array of braille characters in the printing method according to the present disclosure.

Referring to FIG. 12, through actual measurement, a diameter of a "dot" in the current braille printer is about 1.4 mm. Taking the center of the dot as a benchmark, a space size of a cell is about 2 mm×4 mm, and line spacing of braille is about 5 mm, so a cell may be limited to a 5 mm×5 mm area.

Figure 13:
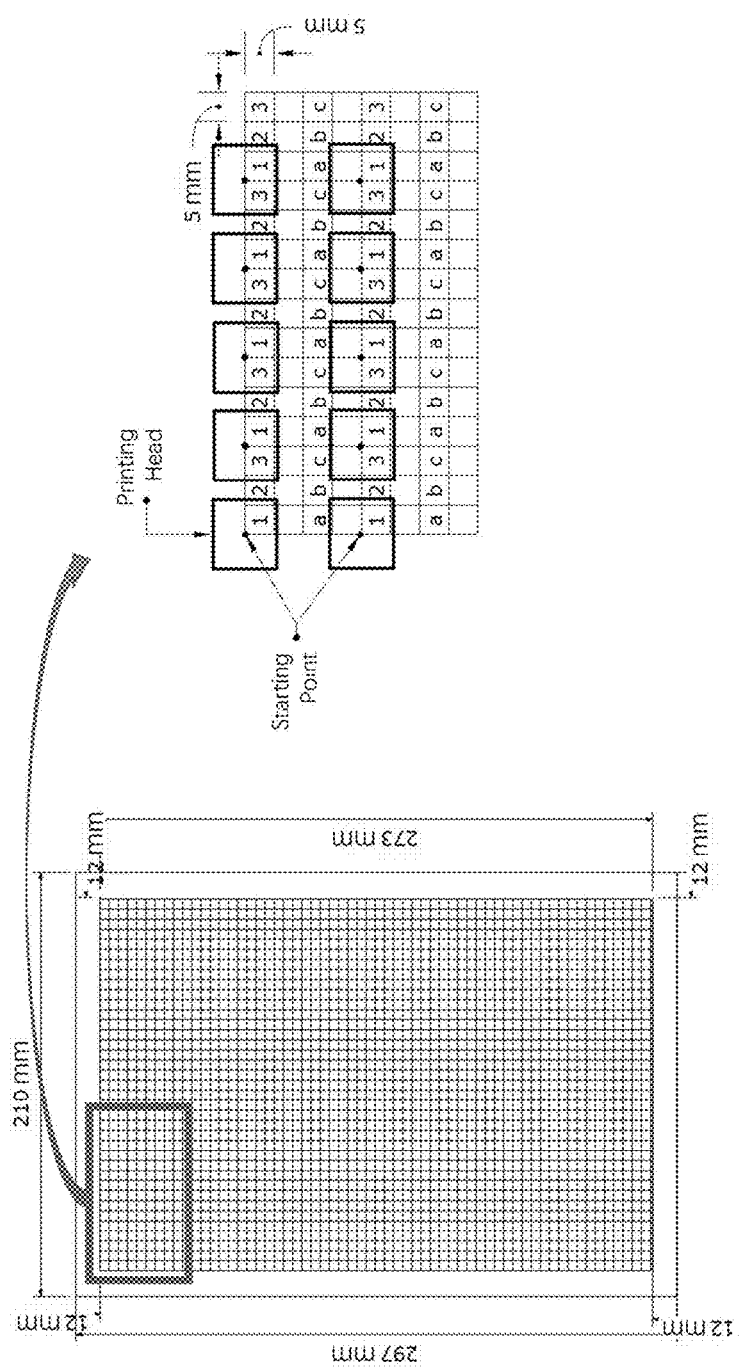
FIG. 13 is a schematic diagram of printing in alternate columns and rows in the printing method according to the present disclosure.

Referring to FIG. 13, when a size of a vertical projection of the printing head is greater than 5 mm×5 mm, printing in alternate columns and rows is needed. When the printing array is at the starting point, each printing head is required to print not only a current cell but also a known number of adjacent cells. For example, if a printing head is required to complete printing of braille not only under the projection and also in adjacent 2 rows and 3 columns (i.e., m=2, n=3), each cell is first moved to the starting point by the printing array carried by the mechanical motion system, then braille printing in a cell numbered "1" is completed, then the printing array moves right to sequentially complete printing of cells numbered "2" and "3", and then the printing array as a whole moves to a starting position of a cell numbered "a" to sequentially complete printing of cells "a", "b" and "c". Therefore, the current printing head is required to complete printing of cells in 2 rows and 3 columns (1, 2, 3, a, b, c), i.e., a total of 6 "cells".

3: Method for Implementing Braille Printing

Figure 14:
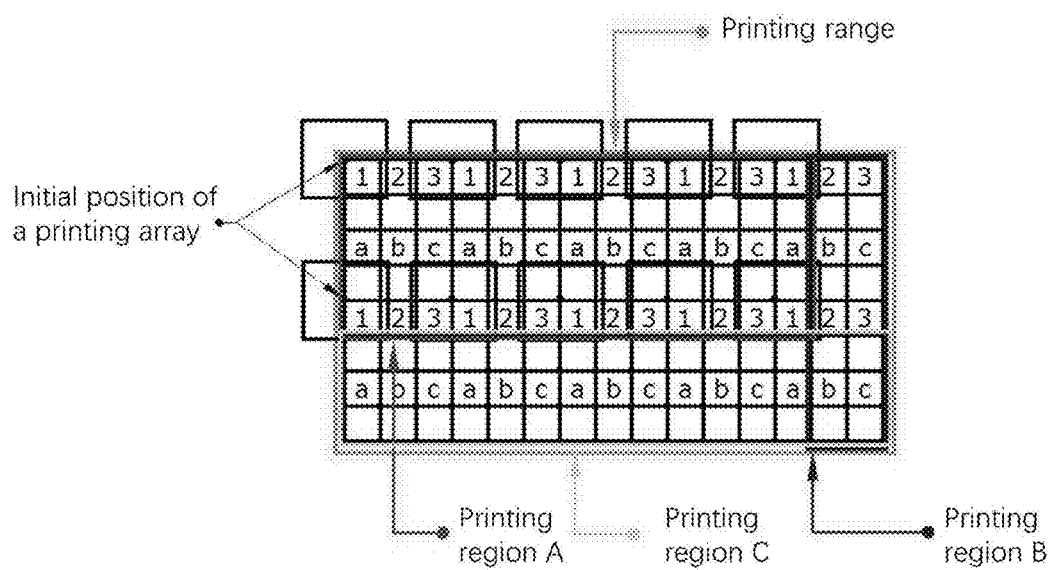
FIG. 14 is a schematic diagram of a braille printing implementation method in the printing method according to the present disclosure.

Referring to FIG. 14, braille is required to be printed into the corresponding cell according to the above method. The mechanical motion system carrying the printing array is at a starting position at the beginning of the printing. In this case, a printing region A projected by the printing array, 2 columns B at the right of the region and 3 rows C below the region are collectively referred to as a "printing range". In this range, the mechanical motion system is not required to perform long-distance motion and can step in an order of 1-2-3-a-b-c to sequentially complete the braille printing in the six cells.

Figure 15:
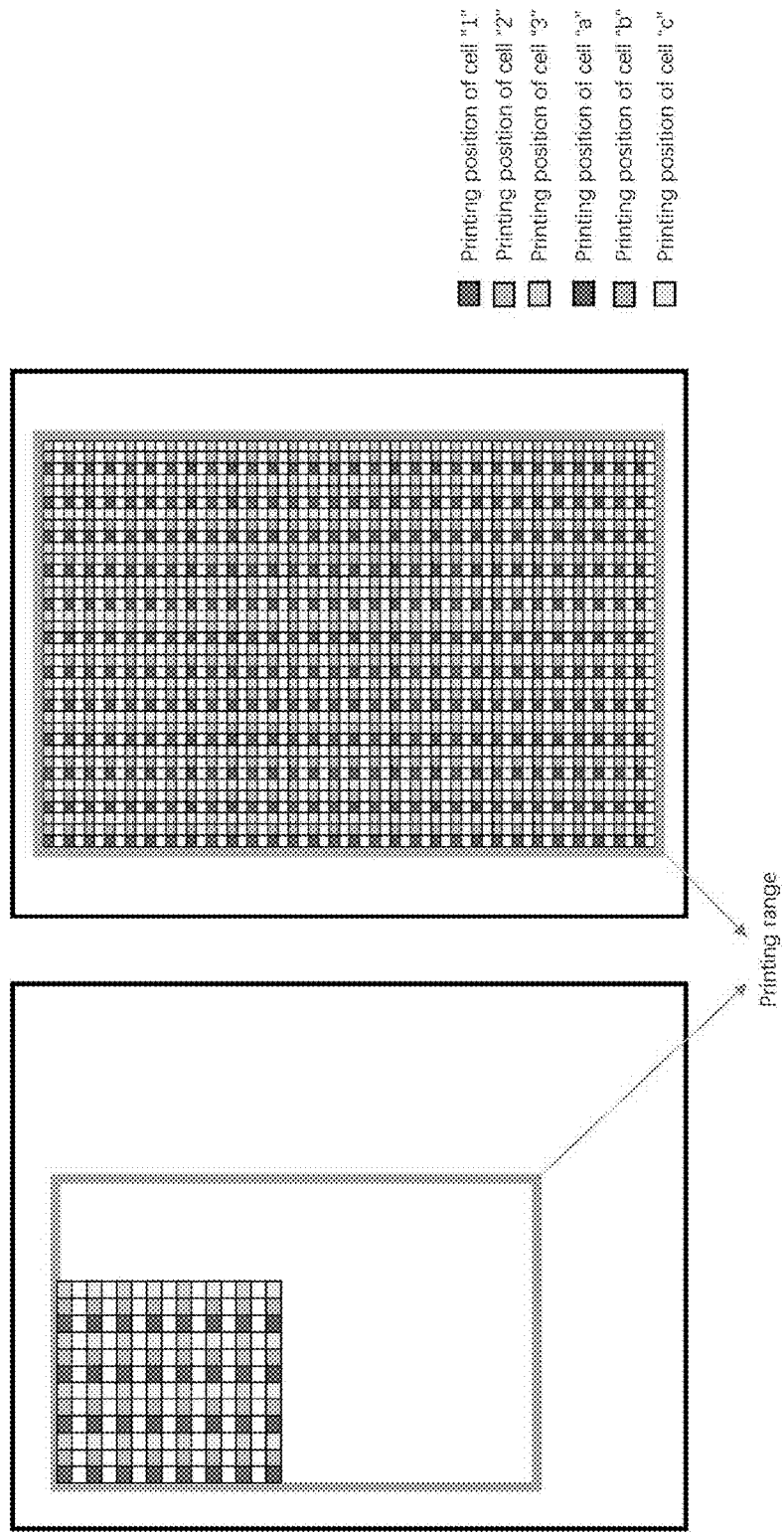
FIG. 15 is a schematic diagram of printing of a printing method according to the present disclosure.

Referring to FIG. 15, in this case, the relation (1) is satisfied. The mechanical motion system is not required to perform long-distance motion and can step in an order of 1-2-3-a-b-c to sequentially complete the braille printing in the six cells.

Figure 16:
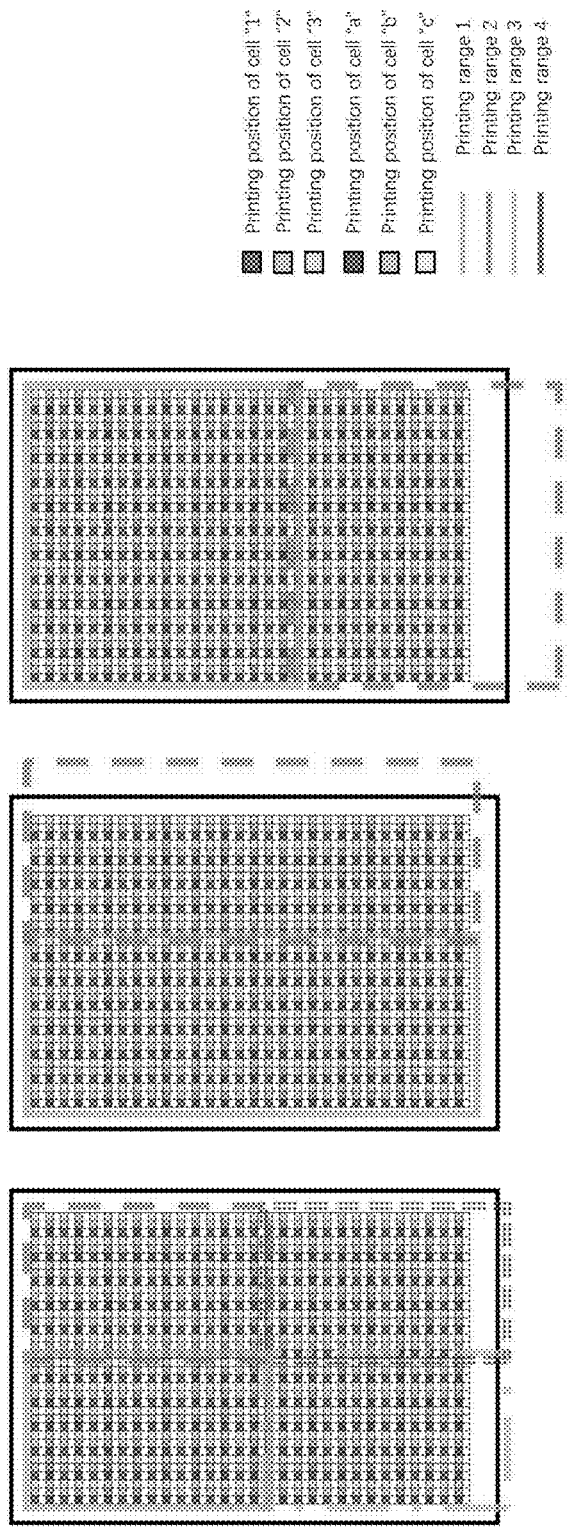
FIG. 16 is a schematic diagram of printing of another printing method according to the present disclosure.
Figure 17:
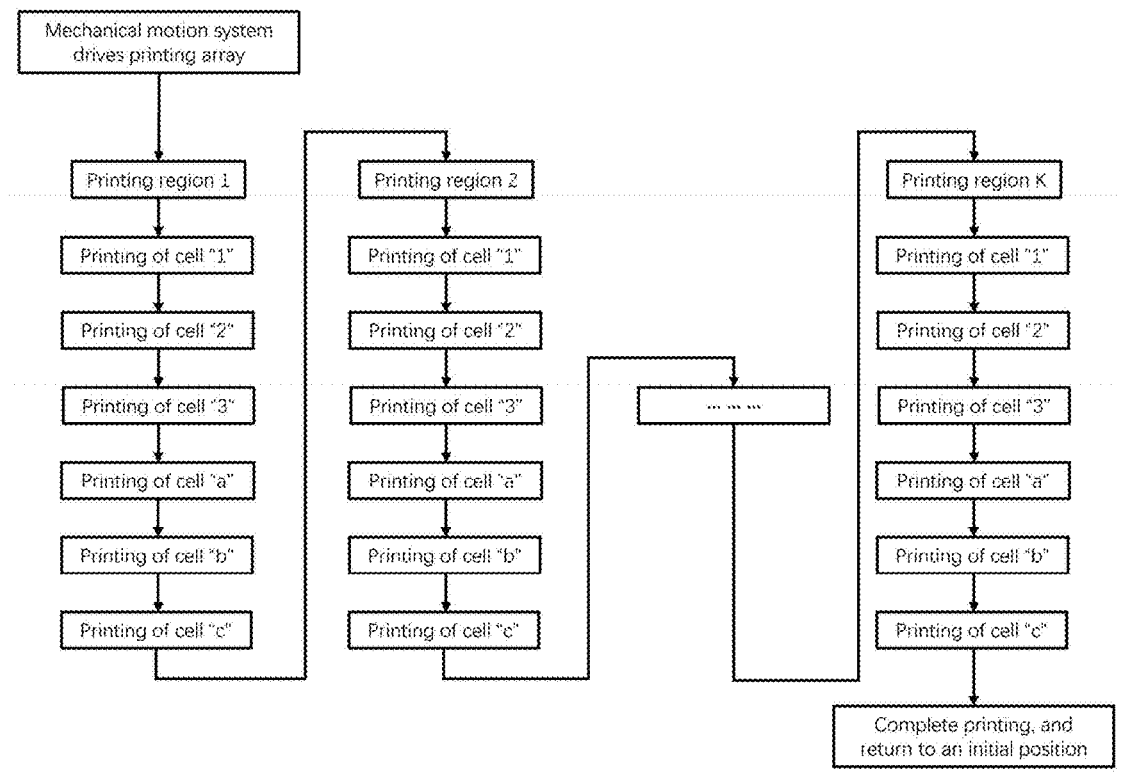
FIG. 17 is a flowchart of printing of a printing method according to the present disclosure.

Referring to FIG. 16, in this case, the relation (2) is satisfied. After completion of the printing range 1, the mechanical motion system is required to move, starting from a top left point of the printing array, to the printing ranges 2, 3 and 4 in sequence to complete braille printing in the corresponding ranges, as shown in FIG. 17.

4. A Method for Pattern Printing is Specifically as Follows.

Figure 18:
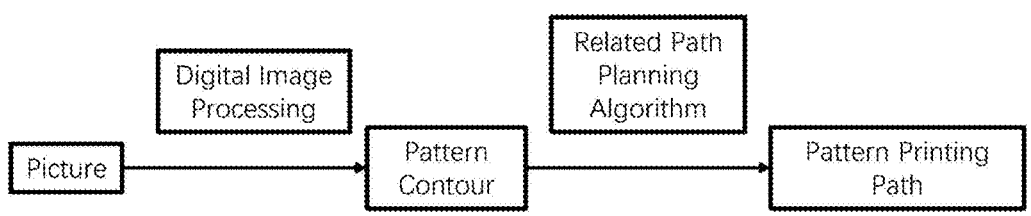
FIG. 18 is a schematic diagram of pattern printing of a printing method according to the present disclosure.

Referring to FIG. 18, firstly, a pattern is converted to a printing path, which is specifically as follows.

In step 1, digital image processing is performed on a drawn picture by binarization and edge extraction to obtain a line contour of the pattern.

In step 2, a path for the printing head to print the pattern is planned according to contour and a related drawing path algorithm.

In addition, in the instruction control system, a length of each pixel in the line contour is required to be set to be equal to a feeding step of a stepping motor.

In the drawing process, the computer host transfers stored path data to the instruction control system through a signal transmission interface, and the instruction control system guides the printing single-dot array from a standby position to a starting position of a drawn line segment according to path parameters. Then, the printing head of the single-dot array is controlled to remain energized and excited, the mechanical motion system is driven to move along the path to an end point of the line segment, and a signal is sent at the end point to retract the printing head. According to this method, the instruction control system completes the continuous drawing of each line in sequence, and finally returns to the standby position after completing the pattern drawing of the whole paper.

Based on the above, the present disclosure has following advantages.

The use of an XY-axis two-dimensional mechanical motion mechanism and the proposed printing array arrangement can realize simultaneous printing of different regions on an ordinary paper. Compared with the prior art, the mechanism has low operation noise and significantly improved printing efficiency.

A braille printing method matching the whole hardware is proposed, which can realize the conversion of text and patterns and the corresponding printing.

Braille printing suitable for ordinary A4 paper reduces the cost of braille printing compared to expensive cowhide braille paper and continuous hole paper.

Continuous lines of a pattern can be printed, which, compared with the current "pixel" pattern composed of discrete dots, has smoother lines and makes it easier for the blind to recognize the pattern.

The above content is intended only to describe the technical idea of the present disclosure and not to limit the protection scope of the present disclosure. Any modification made on the basis of the technical solution according to the technical idea proposed in the present disclosure shall fall into a scope of the present disclosure.

What is claimed is:

1. A braille printing system, comprising:
an instruction control system (300) configured to receive a signal comprising a printing instruction, establish a database comprising a library of common Chinese character pronunciations, a library of polyphones and special words, a library of Chinese initials and Chinese finals, a library of numbers, a library of punctuations and a library of English letters, extract and isolate a text by using special symbols according to a corresponding setting scheme, convert the text into Pinyin according to the database, convert Pinyin, English, numbers and punctuations into braille respectively, convert the braille into a control instruction, and transmit the control instruction to a control panel (200), a paper feeding system (400), a mechanical motion system (500), and a printing system (600);

the control panel (200) configured to transmit an operation instruction for implementing printing to the instruction control system (300);

the paper feeding system (400) configured to receive the operation instruction and feed a paper for printing;

the mechanical motion system (500) configured to receive the operation instruction, drive the paper feeding system (400) and control the printing system (600) to move in a two-dimensional plane; and the printing system (600) configured to receive the control instruction from the instruction control system (300), arrange a printing array of braille characters by dense arrangement or printing in alternate columns and rows according to a longitudinal projection size of at least one printing head, and perform braille printing for continuous braille cell printing and printing in alternate columns and rows respectively.

2. The braille printing system according to claim 1, wherein the control panel (200) is provided with a key configured to realize an on/off function and a pause/start function, a state indicator (203) configured to display a current state of a printer, and a voice prompt module (204) configured to perform voice broadcast.

3. The braille printing system according to claim 1, wherein the paper feeding system (400) comprises a paper slot (401), one end of the paper slot (401) is provided with a lifting plate (406), the paper slot (401) comprises an inlet side provided with a paper deflector (407) and an outlet side provided with a paper outlet (408), and a rubber wheel configured to guide motion of the paper is provided between the paper deflector (407) and the paper slot (401) and between the paper deflector (407) and the paper outlet (408), respectively.

4. The braille printing system according to claim 1, wherein the mechanical motion system (500) comprises an X-axis bracket guide rail (501) and a Y-axis bracket guide rail (503), the X-axis bracket guide rail (501) and the Y-axis bracket guide rail (503) are connected to respective motors to form two linear motion mechanisms, the printing system (600) is connected to and arranged on the Y-axis bracket guide rail (503), the printing system (600) is driven to move forward and backward in a two-dimensional plane by an X-axis motion, and the printing system (600) is driven to move left and right in the two-dimensional plane by a Y-axis motion.

5. The braille printing system according to claim 1, wherein the printing system (600) comprises a printing arm (601), a printing array (602), a printing head (603) and a printing bottom plate (604); the printing arm (601) comprises an end connected to a Y-axis linear motion mechanism of the mechanical motion system (500) and another end connected to the printing array (602), and the printing array comprises an area array (6021) and at least one single-dot array (6022); the printing area array (6021) comprises a plurality of printing heads (603) arranged in rows and columns, and each of the at least one single-dot array (6022) is connected to a respective printing head (603) of the plurality of printing heads (603); and the printing bottom plate (604) is placed on a printing bottom surface and configured to carry the paper for printing.

6. A braille printing method, comprising:

S1: establishing a database comprising a library of common Chinese character pronunciations, a library of polyphones and special words, a library of Chinese initials and Chinese finals, a library of numbers, a library of punctuations and a library of English letters; extracting and isolating a text by using special symbols according to a corresponding setting scheme; converting the text into Pinyin according to the database; converting Pinyin, English, numbers and punctuations into braille respectively; and converting the braille into a control instruction;

S2: receiving the control instruction in step S1, and arranging a printing array of braille characters by dense arrangement or printing in alternate columns and rows according to a longitudinal projection size of at least one printing head;

S3: performing braille printing for continuous braille cell printing and printing in alternate columns and rows respectively; and S4: printing a pattern.

7. The braille printing method according to claim 6, wherein in S1, said extracting and isolating Pinyin, English, numbers and punctuations by using special symbols comprises:

S1011: extracting structures of pronunciation units each formed by a character or a term, and storing each of the extracted structures separately with [ ];

S1012: extracting structures of units each formed by successive Arabic numerals, and storing each of the extracted structures separately with [ ];

S1013: extracting structures of units each formed by English or a punctuation, wherein each letter of English is taken as an extraction unit; and storing each of the extracted structures separately with [ ]; and S1014: converting Chinese characters into Pinyin according to the library of common Chinese character pronunciations and the library of polyphones and special words, and storing each of the extracted structures separately with [ ].

8. The braille printing method according to claim 6, wherein in S1, said converting Pinyin, English, numbers and punctuations into braille comprises:

S1021: starting from a top left point of a braille cell, sequentially numbering six dot positions of the braille cell as 1, 2, 3, 4, 5 and 6 in an order "from top to bottom and then from left to right"; and defining the braille cell as a two-dimensional matrix with three rows and two columns of [[0,1,0],[1,0,1]], where "1" and "0" indicate whether a dot exists at a respective dot position of the six dot positions;

S1022: setting a number of cells displayed per row to realize typesetting; and

S1023: mirroring each braille and each row of braille regarding left and right, since the braille is written from right to left during printing.

9. The braille printing method according to claim 6, wherein in S3, when printing in alternate rows and columns is adopted, a printing range formed by a printing region projected by the printing array, m columns adjacent to the printing region and n rows below the printing region is determined; a number of cells per row is defined as L, a size of the printing array is defined as M rows and N columns, and a number of rows printed on each paper is defined as K, then following relations are determined:

$$\begin{cases} L \times K \leq n \cdot N \times m \cdot M, \text{ where } L \leq n \cdot N, \text{ and } K \leq m \cdot M & (1) \\ L \times K > n \cdot N \times m \cdot M, \text{ where } L > n \cdot N, \text{ and } K > m \cdot M & (2) \end{cases}$$

when the relation (1) is satisfied, it indicates that a braille region on a paper is less than or equal to a coverage of the array in one printing; after completion of printing a current cell of the braille, each of the at least one printing head of the mechanical motion system sequentially prints cells of the braille in adjacent a columns and b rows according to a set step strategy; and a printing signal is not received when a corresponding printing head does not perform braille printing on any content; and when the relation (2) is satisfied, it indicates that the braille region on a paper is beyond a coverage of the array in one printing; and after completion of printing a current printing range, the mechanical motion system moves to a subsequent printing range based on a spatial location of the printing array to print the braille within the subsequent printing range.

10. The braille printing method according to claim 6, wherein in S4, said printing a pattern comprises: firstly, converting a pattern to a printing path, and performing digital image processing on a drawn picture by binarization and edge extraction, to obtain a line contour of the pattern; then, planning, according to the contour and a related drawing path algorithm, a path for the at least one printing head to print the pattern; setting, in an instruction control system, a length of each pixel in the line contour to be equal to a feeding step of a stepping motor; and completing continuous drawing of each line in turn, and returning to a standby position upon completion of printing the pattern on a whole paper.

* * * * *